Figure 1:
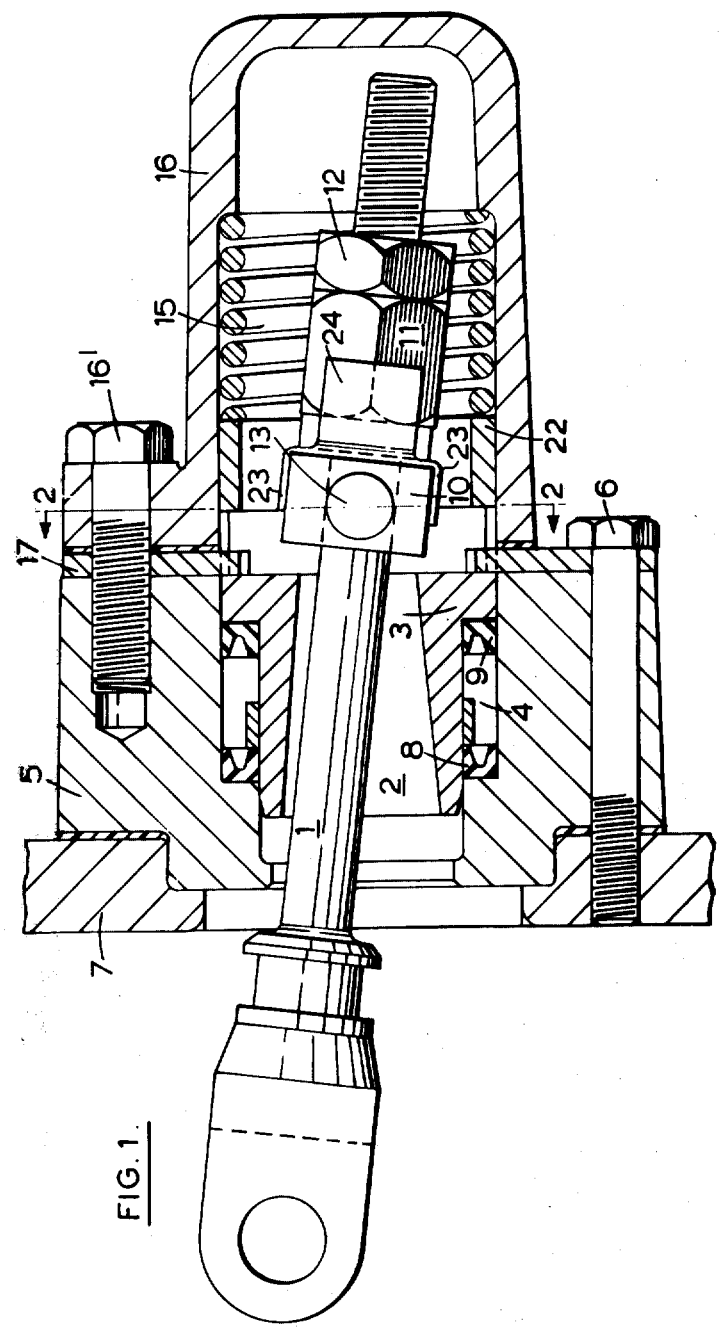

United States Patent [19]

Ostrowski

[11] 4,004,657
[45] Jan. 25, 1977

[54] SELF-ENERGIZING DISC BRAKES
[75] Inventor: Piotr Ostrowski, Sutton Coldfield, England
[73] Assignee: Girling Limited, Birmingham, England
[22] Filed: Jan. 21, 1974
[21] Appl. No.: 435,311
[30] Foreign Application Priority Data
Jan. 20, 1973 United Kingdom ............... 3075/73
[52] U.S. Cl. .............................. 188/71.3; 92/107; 92/129; 92/187; 188/72.4; 188/365
[51] Int. Cl.² ................. F16D 55/04; S16D 55/18; F16J 1/10
[58] Field of Search ............. 92/187, 165, 165 PR, 92/107, 108, 129, 130 A; 188/366, 368, 70, 72.4, 72.6, 71.3, 365, 170

[56] References Cited
UNITED STATES PATENTS

| 1,086,161 | 2/1914 | Grasso | 92/165 X |
| 1,901,766 | 3/1933 | Newhouse | 92/107 |
| 2,395,911 | 3/1946 | Schoenfeld | 92/165 X |
| 2,956,549 | 10/1960 | Malpass | 92/165 X |
| 3,137,211 | 6/1964 | Grinnell, Jr. | 92/165 X |
| 3,204,624 | 9/1965 | Rutenber et al. | 92/108 X |
| 3,230,784 | 1/1966 | Heidenstram et al. | 92/107 X |
| 3,313,215 | 4/1967 | Bieri | 92/165 X |

FOREIGN PATENTS OR APPLICATIONS 1,277,345 6/1972 United Kingdom

Primary Examiner—Irwin C. Cohen
Attorney, Agent, or Firm—Scrivener Parker Scrivener and Clarke

[57] ABSTRACT

In a spreading disc brake relative angular movement of the pressure plates to initiate the application of the brake is effected by a fluid pressure actuator acting on a pull-rod through a pivotal thrust coupling so arranged as to confine rocking movement of the pull-rod to a single plane normal to the brake axis.

1 Claim, 7 Drawing Figures

SELF-ENERGIZING DISC BRAKES

In the application of the brake the lugs on the pressure plates move circumferentially about the brake axis taking the toggle links and the inner end of the pull-rod with them. The inner end of the pull-rod thus swings in a plane substantially normal to the brake axis. If twisting and bending of the rod is to be prevented it is therefore essential for the axis of the pivotal coupling to remain substantially parallel to the brake axis.

The present invention achieves this by keying the pivotal coupling to the actuator member which is fixed to the brake housing.

According to the invention we now propose a disc brake of the kind set forth in which the angular movement of the pressure plates to initiate the application of the brake is effected by a fluid pressure actuator acting on an abutment on the pull-rod which passes through the actuator with a substantial clearance, the actuator comprising cylinder and piston members of which the axis is substantially at right angles to the axis of the brake and of which one member is rigidly fixed relative to the housing, the other member acting on the abutment through a pivotal thrust coupling which allows movement of the rod relative to said other member in one plane only of the brake, the pivotal coupling being keyed directly or indirectly to the fixed member against rotation about the actuator axis so as to maintain the pivotal axis of that coupling substantially parallel to the brake axis whereby the plane to which rocking movement of the rod is confined is sustantially normal to the brake axis.

Usually the cylinder of the actuator will be fixed relative to the housing and the piston will act on the pull-rod through the coupling.

The pivotal coupling may be directly keyed to the cylinder but preferably the pivotal coupling is fixed against rotation about the actuator axis to a thrush member which transmits the force from the piston to the coupling, and the thrust member is keyed to the cylinder.

The thrust member itself may be keyed to the cylinder or it may form an integral part of the piston which is keyed to the cylinder.

Figure 2:
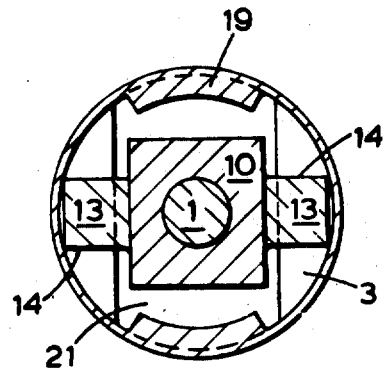
Figure 3:
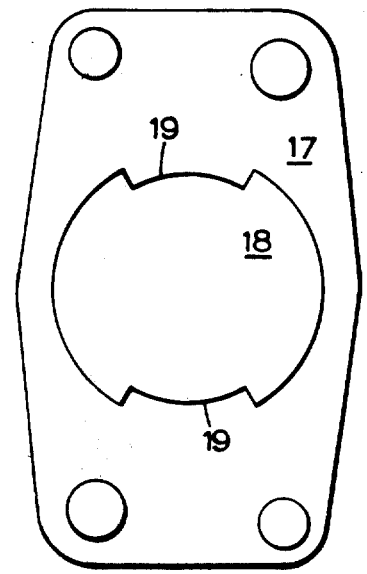
Figure 4:
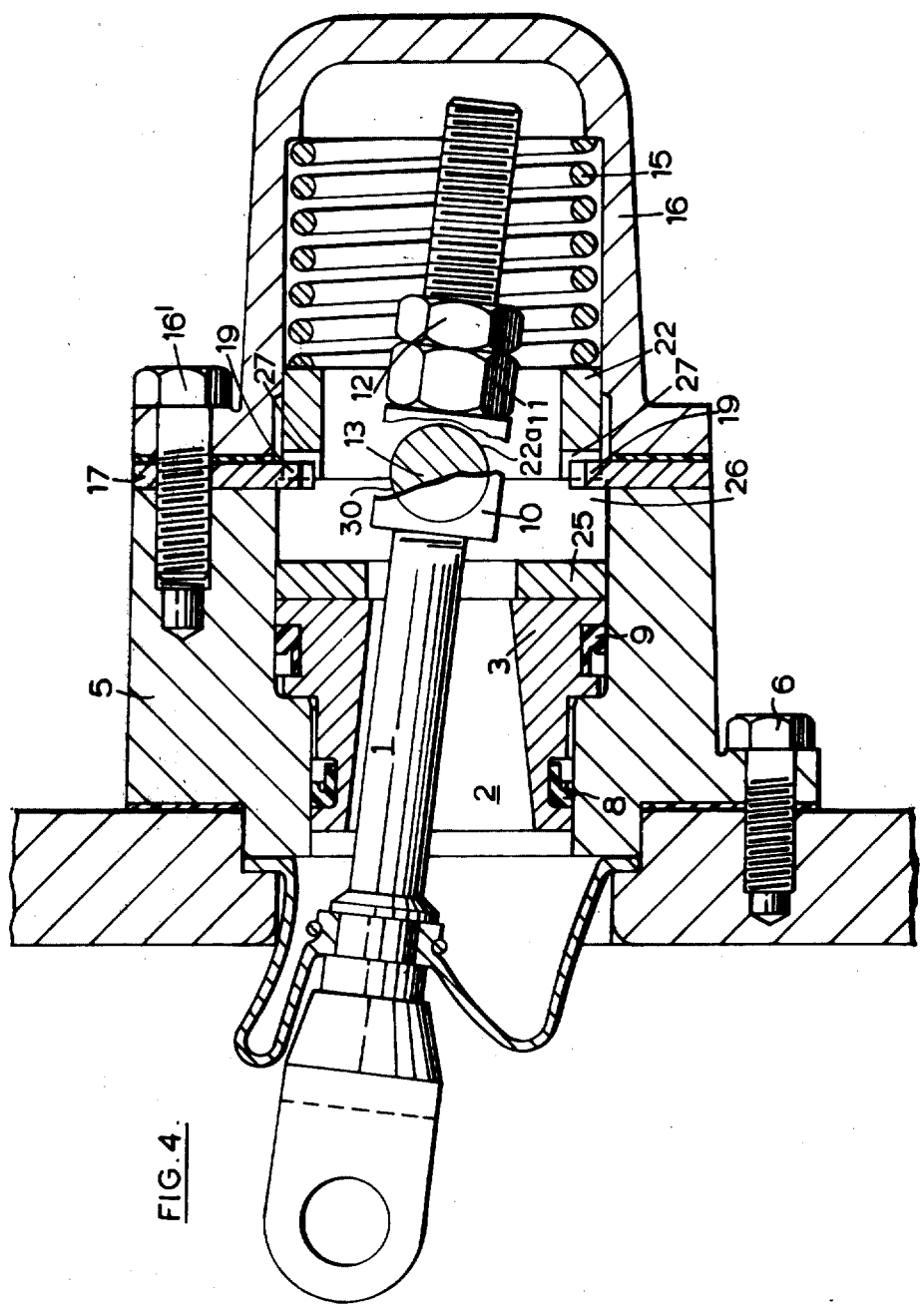
Figure 5:
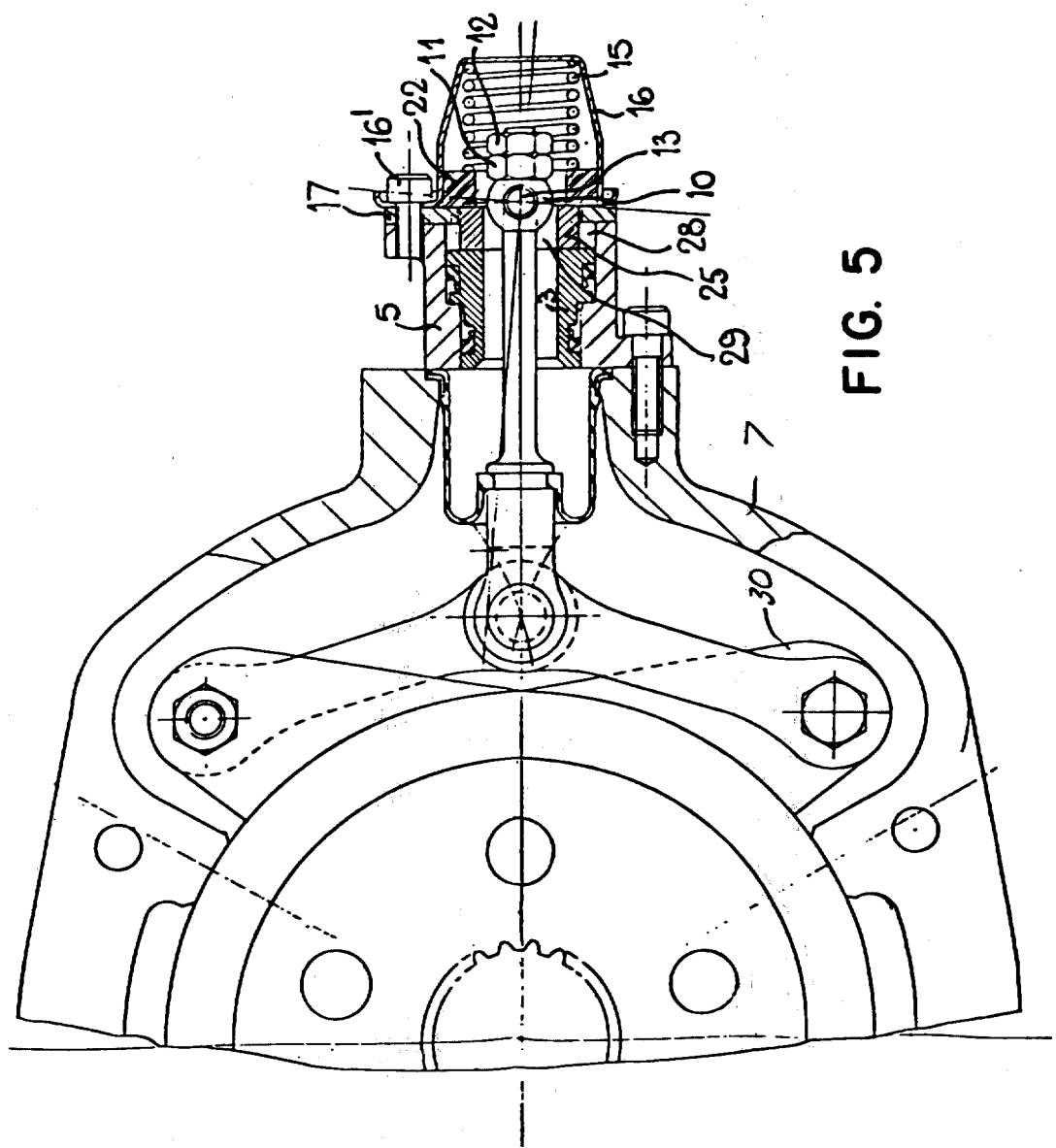
Figure 7:
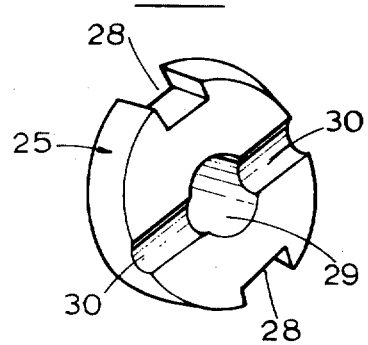

Three actuator assemblies for disc brakes in accordance with the invention will now be described, by way of example only, with reference to the accompanying drawings in which:

FIG. 1 is a longitudinal section of an hydraulic actuator assembly with the piston being shown in the fully advanced brake-applying position, FIG. 2 is a fragmentary section of the piston and trunnion on the line 2—2 of FIG. 1, FIG. 3 is an end elevation of a locating plate of the actuator assembly of FIG. 1, FIG. 4 is a longitudinal section of a second hydraulic actuator assembly incorporating a separate thrust member between the piston and the pivotal coupling, the piston and thrust member being shown in their fully retracted positions when the brake is inoperative, FIG. 5 is a broken longitudinal section of a third hydraulic actuator assembly of compact from achieved by using an abutment on the pull-rod of generally spherical shape, the assembly being shown connected to brake pressure plates 31 with the piston and thrust member being shown in their fully retracted positions, FIG. 5 is a perspective view of the thrust member forming part of the actuator shown in FIG. 4; and FIG. 7 is a perspective view of the thrust member forming part of the actuator shown in FIG. 5.

Referring firstly to the actuator assembly shown in FIGS. 1 to 3, a pull-rod 1 is adapted at its inner end to be pivotally connected to the junction of two toggle links attached to radially projecting lugs on the pressure plate of the brake.

The rod passes axially through a hollow bore 2 providing substantial clearance for the rod in a piston 3 working in a stepped cylinder bore 4 in a cylinder body 5 rigidly secured by bolts 6 to the stationary housing 7 of the brake. The piston is sealed by spaced seals 8, 9.

An abutment in the form of a rectangular block 10 is mounted on the rod with clearance at the outer end of the piston and is backed by a nut 11 and a lock-nut 12. The block 10 is provided with transverse trunnion pins 13 the ends of which are pivotally received in part-cylindrical grooves 14 in outward extensions of the piston so that the rod can rock about the piston in a single plane. This piston is loaded by a compression spring 15 located in a cup-shaped cover 16 secured to the body 5 by bolts 16'.

To key the piston slidably against angular movement an apertured locating plate 17 of the outline shown in FIG. 3 is clamped between the cover 16 and the body 5.

The plate has an opening 18 of greater diameter than the piston, but diametrically opposed arcuate tongues 19 project inwardly from the periphery of the opening for sliding engagement in a straight-sided slot 21 which extends diametrically through the piston for part of its axial length and also accommodates the block 10.

The tongues 19 also form a stop for the outward movement of the piston when in its position of maximum stroke as shown in FIG. 1.

A nylon ring 22 is interposed between the spring and the inner end of the piston, the ring being provided at its inner ends with par-cylindrical recesses (not shown) which fit over the trunnion pins to complete a bearing for the pins.

Adjustment of the block 10 on the rod is effected by rotating the nut 11 after slackening the lock nut 12.

A device is shown in FIG. 1 for facilitating adjustment by predetermined increments. The device is formed from resilient sheet metal and comprises a washer sandwiched between the block 10 and the nut 11 and having a pair of opposed arms 23 gripping the sides of the trunnion block and another pair 24 gripping opposed corners of the nut 11. The arms 24 are of Vee formation to correspond to the contour of the nut, and when the nut is rotated for adjustment a click is produced as the arms 24 ride over the surface of the nut from one corner to the next.

Figure 6:
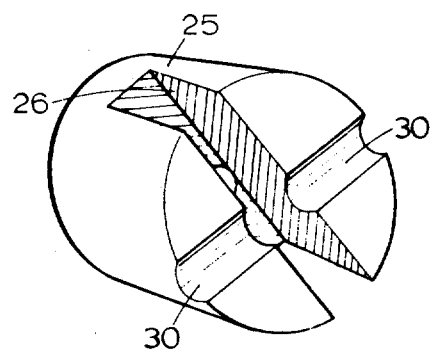

Referring now to the second actuator assembly shown in FIG. 4. Corresponding parts are indicated by the same reference numerals. The second actuator is similar to the first but differs from it in having a thrust member 25 interposed between the piston and the trunnion pins 13, the recesses to receive the trunnion pins being formed in the outer end of the thrust member 25. As seen best in FIG. 6, the piston 3 abuts in the inner end of the thrust member. The thrust member comprises a solid cylinder formed with a straight sided diametral slot 26 extending axially from the outer end of the thrust member for about two-thirds of the axial length of it. In this actuator it is the thrust member that is keyed to the cylinder by the inwardly projecting tongues 19 of the locating plate 17 engaging in the slot 26. The thrust member 25 is provided with aligned part-cylindrical bearing recesses 30 in the outer end of of the thrust member on opposite sides of the bore 29.

The hydraulic seals 8 and 9 of this actuator are L-shaped and fit into recesses in the piston 3.

The nylon ring 22 in this case is relieved at 27 at its inner end to receive the tongues 19 of the plate 17 when the piston 3 and thrust member 25 are in their fully retracted positions. As can be seen in the broken away part of FIG. 4., the ring 22 is provided with part cylindrical bearing recesses 22a which, with the recesses 30 of the thrust member 25, rockingly receive the trunnion pins 13 of the block 10.

Referring lastly to the third assembly shown in FIG. 5 wherein the actuator is shown connected to brake pressure plates 31 within a brake housing 7, it being understood that each of the preceding actuators would be similarly connected. Again there is a separate thrust member 25. The block 10 is of generally spherical shape and allows of a more compact form of thrust member as shown in FIG. 7 which is simply provided with a cylindrical bore 29 to receive the block with clearance, opposed grooves 28 extending axially for the full length of the thrust member to keying it to the plate 17. The nylon ring 22 is provided with bearing recesses (not shown) similar to the recesses 22a shown in FIG. 4 which match the recesses 30 in member 25 to receive the trunnion pins 13.

It will be appreciated that any suitable means may be employed for keying the pivotal coupling to the fixed actuator member.

The coupling between the pull-rod the movable actuator member could be formed by a pin and clevis or equivalent arrangement.

I claim:

1. In a spreading disc brake of the type having pressure plates which are angularly movable within a brake housing to initiate application of the brakes and wherein the angular movement of the plates is effected by an annular fluid pressure actuator which acts on an abutment carried by a pull-rod passing through the actuator with substantial clearance to operate in tension on toggle links connected to said pressure plates; said actuator being a cylinder housing rigidly fixed to the brake housing with the cylinder axis substantially at right angles to the axis of the plates and a piston operating in said cylinder: the invention comprising improved means for transmitting the thrust of said piston to the abutment carried by the pull-rod comprising a thrust member co-axially aligned with the piston and slidable therewith in said cylinder housing to transmit the force exerted by the piston, spring means urging said thrust member against said piston and urging said piston into the retracted position, a trunnion member forming part of said thrust member, part cylindrical bearings in said thrust member for rockably receiving said trunnion member, a substantially annular member slidably received in said cylinder housing between said thrust member and said spring means, said annular member having part cylindrical bearings complementary to the bearings in said thrust member and also rockingly receiving said trunnion member, and key means cooperating with said cylinder housing and said thrust member for maintaining the pivotal axis of the coupling parallel to the axis of the brake while confining angular movement of said pull-rod to a plane normal to the axis of the brake, said key means comprising an apertured plate fixed to said cylinder housing and extending across the outer end of the cylinder, an axially extending slot in said thrust member, and a projection on said apertured plate extending into said slot.

* * * * *